United States Patent Office 3,551,516
Patented Dec. 29, 1970

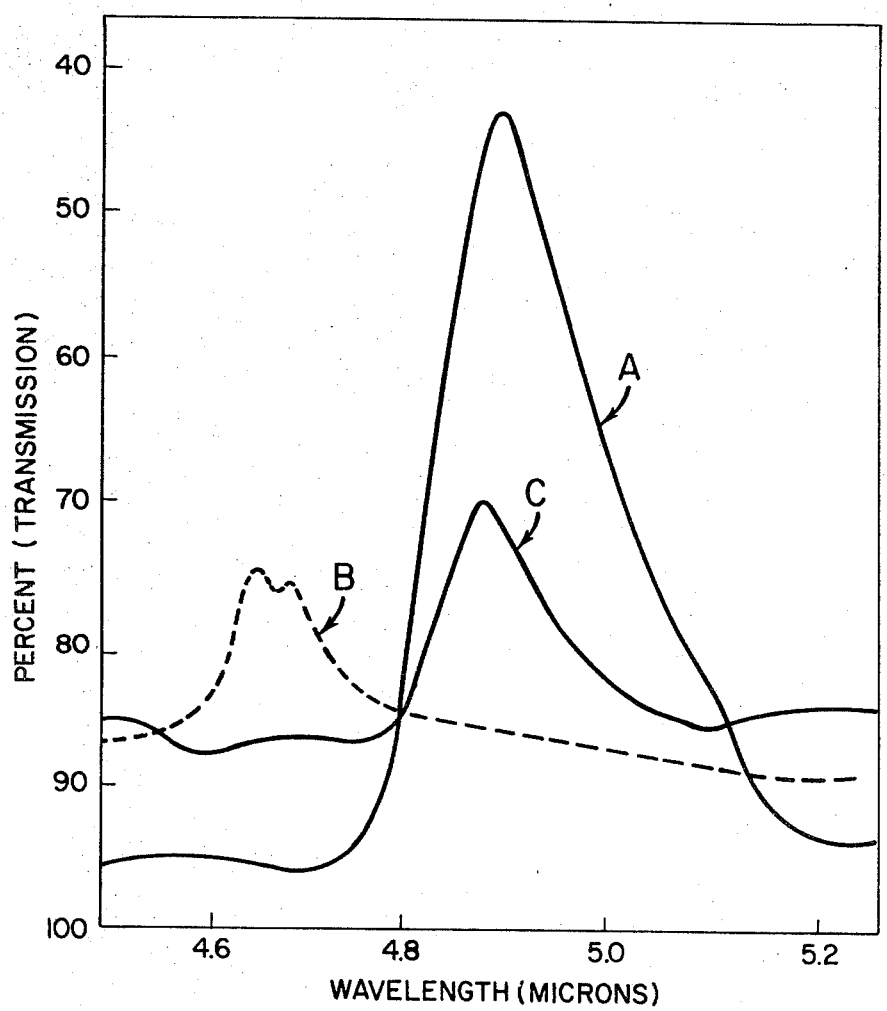

3,551,516
HYDROCARBON CONVERSION CATALYST AND PROCESS
Kenneth D. Ashley, Sarasota, Fla., and John H. Estes, Wappingers Falls, N.Y., assignors to Texaco Inc., New York, N.Y., a corporation of Delaware
Continuation-in-part of applications Ser. No. 102,641 and Ser. No. 102,668, Apr. 13, 1961. This application Dec. 21, 1964, Ser. No. 419,755
Int. Cl. C07c 5/24
U.S. Cl. 260—683.68                                    13 Claims

ABSTRACT OF THE DISCLOSURE

A catalyst for isomerization of paraffinic hydrocarbons is prepared by contacting a composite of platinum and alumina with an activating agent selected from the group consisting of carbon tetrachloride, chloroform, methylene chloride, phosgene and trichloroacetyl chloride.

---

This is a continuation-in-part of application Ser. No. 102,641, and application Ser. No. 102,668, both filed Apr. 13, 1961 and both of which are now abandoned.

This invention relates to a hydrocarbon conversion catalyst and process and more particularly to a catalyst, its method of preparation and its use in a process for the isomerization of isomerizable hydrocarbons. In accordance with this invention, an isomerization catalyst is prepared by contacting a composite of platinum and alumina with an activating agent consisting essentially of an organic chloride selected from the group consisting of carbon tetrachloride, chloroform, methylene chloride, phosgene and trichloroacetyl chloride at a temperature within the range of 300 to 650° F.

Isomerization is widely employed in petroleum refining to effect conversion of straight chain hydrocarbons to branched chain hydrocarbons. The conversion of straight chain hydrocarbons to branched chain hydrocarbons is useful, for example, in increasing the octane numbers of gasoline boiling range hydrocarbons and as a means of forming reactive tertiary carbon atoms as in isobutane.

In accordance with early developed isomerization processes, normal butane was isomerized to isobutane with a catalyst comprising aluminum chloride and hydrogen chloride at a temperature within the range of about 180 to 270° F. The aluminum chloride was employed as a deposit on a porous support, for example bauxite, or as a sludge comprising a complex of aluminum chloride, hydrogen chloride and hydrocarbon. Although widely used during wartime for the production of isobutane, the aluminum chloride isomerization process suffered many disadvantages including high catalyst consumption, loss of catalyst and fouling of equipment by catalyst migration by sublimation, and corrosion of the processing equipment. These disadvantages become even more pronounced in the isomerization of hydrocarbons higher boiling than butane where catalyst consumption is greatly increased and undesired side reactions consume a part of the feed stock even when hydrogen is used as an inhibitor.

Subsequent to the development of catalytic reforming of gasolines, a catalyst developed for that purpose comprising platinum, combined halogen and a refractory oxide was shown to exhibit isomerization activity at relatively high temperatures within the range of about 850 to about 950° F. This type catalyst has been found advantageous as compared with aluminum chloride in the isomerization of pentane and higher boiling hydrocarbons as well as butane since many of the problems associated with aluminum chloride were not encountered such as decomposition, sludge formation and undesired side reactions. Since the amount of branched chain isomers present in an equilibrium mixture decreases with increasing temperature, isomerization at high temperatures is incapable of producing as high a yield of branched chain isomers as can be produced at low temperature. Furthermore, the isomerizing activity of reforming catalyst is relatively low so that substantially less than equilibrium yields are obtained. The yields of branched chain isomers on a once through basis are therefore very low and high ultimate yields can only be obtained by repeated fractionation and recycle of unconverted straight chain hydrocarbons.

In an effort to overcome these disadvantages, it has been found that the isomerization activity of platinum reforming type catalyst may be improved by compositing it with alumimum chloride or some other Friedel Crafts halide. This may be effected by subliming aluminum chloride on to a suitable platinum-alumina composite. Although such a catalyst exhibits isomerization activity at temperature within the range of about 300 to 525° F., many of the disadvantages of using and handling aluminum chloride are encountered.

It is an object of this invention to provide an isomerization process and catalyst effective to produce high yields of branched chain hydrocarbons.

We have discovered a new and highly effective means of imparting high isomerization activity to a platinum-alumina composite. In accordance with this invention, a catalyst is produced which has high isomerization activity at relatively low temperatures at which equilibrium favors production of maximum amounts of branched chain hydrocarbons. Our isomerization process is effected in the presence of a highly active catalyst wherein platinized alumina is activated by contact with an acid chloride or alkyl chloride activating agent. An advantage of the process of this invention is that the high catalyst activity at low temperatures leads to the production of high single pass yields of branched chain products of high octane number. Another advantage of this invention is that undesirable side reactions and decomposition reactions are avoided at the low temperature employed. Another advantage of the process of this invention is that the catalyst is easily prepared, is highly stable, and is not subject to migration due to subliming of a component.

Our catalyst is useful for the isomerization of isomerizable hydrocarbons. More particularly it is useful for the isomerization of straight chain hydrocarbons having at least four carbon atoms. It is applicable to the treatment of streams comprising predominantly a single hydrocarbon, for example, normal butane or to the treatment of hydrocarbon mixtures, for example, gasoline fractions. Although the greatest octane number improvement is effected upon treating normal paraffins, streams containing moderately branched hydrocarbons or mixtures having less than equilibrium amounts of branched chain hydrocarbons may be improved with our process. Naphthenes and alkyl aromatics may also be treated in accordance with our invention.

The catalyst used in the process of this invention comprises a platinum-alumina composite which is activated with an organic chloride. The alumina, which comprises the major portion of our catalyst, is preferably eta alumina. (The terminology of aluminas herein employed is that defined in "Technical Paper No. 10, Second Revision, Alumina Properties" published by Aluminum Company of America, 1960.) Eta alumina may be prepared by heating beta alumina trihydrate, suitably at a temperature within the range of about 500 to 1200° F. Beta alumina trihydrate is an article of commerce and may be produced by various methods well known in the art. Platinum is added to the alumina in an amount within the range of about 0.01 to about 1.0 weight percent of the calcined alumina. The platinum may be added by various well known methods including, for example, by impregnation with a water soluble platinum containing compound such as chloroplatinic acid, or precipitation of platinum as sulfide by passing hydrogen sulfide through an aqueous solution of a platinum compound prior to or in contact with an alumina support. In accordance with some prior art catalyst compositions, combined halogen is incorporated in the catalyst composite by treating the support, usually prior to platinum addition, with a hydrogen halide, for example, hydrogen fluoride or hydrogen chloride. We have found that combined halogen in this form is unnecessary in the preparation of an active catalyst by the method of our invention.

The platinum-alumina composite used in the process of this invention is activated by treatment with an alkyl chloride or an acid chloride activating agent under conditions effective to react at least a portion of said activating agent with at least one component of said composite. Alkyl chloride and acid chlorides which may be used in the process of this invention include those having an atomic ratio of chlorine to carbon of at least two to one, for example, carbon tetrachloride, phosgene (which may be considered as either chloroformyl chloride or the acid chloride of carbonic acid) and trichloroacetyl chloride. Carbon tetrachloride and phosgene are preferred activating agent since they are inexpensive, produce a catalyst of high activity, and may be conveniently employed as a gas or vapor. Organic chlorides having atomic ratios of chlorine to carbon less than two to one, for example, methyl chloride, ethylene chloride and monochloroacetyl chloride, have been found ineffective as activating agents. In accordance with our method of activation, a platinum-alumina composite is admixed with a chloride activating agent containing chlorine in an amount within the range of about 5.0 to 40.0 percent by weight of the platinum-alumina composite. The chloride-platinum-aluminum mixture is then heated to a temperature of at least 300° F. and preferably within the range of about 400 to 650° F. The catalyst thus activated is stored in an inert atmosphere, for example, nitrogen, until used. Reduction of the catalyst with hydrogen prior to use for isomerization is unnecessary. Carbon monoxide and chlorine react to form phosgene in the presence of alumina and mixtures of carbon monoxide and chlorine may be employed to form phosgene in situ in the activation of our catalyst. When we refer to activation with phosgene in this specification and claims, we include activation with carbon monoxide and chlorine in admixture.

The catalyst may be provided in pellet, granular, bead, or pulverulent form to facilitate its use in fixed beds, moving beds, or fluidized solids beds as is well known in the art. The isomerization process employing our activated catalyst is effected at relatively low temperatures. Gasoline fractions, for example, light straight run gasoline and natural gasoline, are treated at temperatures within the range of 200 to 350° F. and preferably within the range of 250 to 280° F. Hydrocarbon streams consisting chiefly of pentanes and hexanes are isomerized at temperatures within the range of about 250 to 350° F. and preferably within the range of about 280 to 300° F. Butane isomerization is effected at temperatures within the range of about 300 to 400° F. and preferably within the range of about 350 to 370° F. Isomerization may be effected in either the liquid or vapor phase. Pressure has been found to have little effect in our process, other than determining whether liquid or vapor phase conditions prevail and pressures within the range of about 300 to 500 lbs. per square inch gauge have been found convenient. A liquid hourly space velocity, that is the volume of liquid charge per hour per volume of catalyst, within the range of about 0.5 to 2.0 and preferably within the range of about 0.75 to 1.5 is employed. Hydrogen is included in the isomerization feed at a mole ratio of hydrogen to hydrocarbon within the range of about 0.20:1 to 5:1 and preferably within the range of about 2:1 to 3:1.

EXAMPLE I

An eta alumina catalyst base is prepared by heating beta alumina trihydrate for two hours at 1,000° F. The calcined eta alumina is cooled and admixed with an aqueous solution of chloroplatinic acid employing ethylene diamine as a dispersing agent. The chloroplatinic acid solution equals 77% by weight of the alumina and containing platinum in an amount of 0.5 percent by weight of the alumina. The eta alumina and chloroplatinic acid solution are mixed and the mixture dried with occasional stirring at 225° F. The impregnated catalyst is heated to a temperature of 300° F. for one hour, to 750° F. in increments over a period of about four and one half hours, and then heated to 1,050° F. for two hours. The resulting platinized eta alumina composite is cooled and protected from moisture. This platinized eta alumina, when evaluated at the conditions employed in Example II, following shows no activity as an isomerization catalyst.

EXAMPLE II

A portion of the platinized alumina of Example I is contacted with gaseous phosgene. The catalyst and phosgene are heated over a period of four hours to a temperature of 600° F. and held at this temperature for one half hour. The thus activated catalyst is cooled, vented and protected from moisture until use. Another portion of the platinized eta alumina is contacted with an equimolar mixture of carbon monoxide and chlorine by the same procedure. Other portions of the platinized eta alumina composite are treated with carbon tetrachloride, chloroform, methylene chloride, trichloroacetyl chloride, methyl chloride, ethylene chloride, nitrosyl chloride, phosphoryl chloride, silicon tetrachloride, and monochloroacetyl chloride, heated to a temperature of 500° F. and held at this temperature for two hours. The foregoing catalysts are contacted with a hexane feed stock at a temperature of 300° F., a liquid hourly space velocity of 1, a hydrogen to hydrocarbon mole ratio of 3.2:1, and a pressure of 300 p.s.i.g. with the results shown in Table I.

TABLE I

| Catalyst description | | | Product isomer distribution | | | | | | |
|---|---|---|---|---|---|---|---|---|---|
| Activating agent | Percent Pt | Percent Cl | n-hexane | 2-methyl pentane | 3-methyl pentane | 2,2-dimethyl butane | 2,3-dimethyl butane | Cyclics | Pentane and lighter |
| Phosgene (COCl$_2$) | 0.5 | 6.9 | 11.9 | 32.1 | 18.2 | 26.0 | 8.9 | 1.7 | 1.2 |
| Equimolar mixture of CO plus Cl$_2$ | 0.5 | 6.0 | 11.8 | 32.4 | 17.9 | 24.3 | 9.8 | 2.2 | 1.6 |
| Carbon tetrachloride (CCl$_4$) | 0.5 | 6.7 | 10.7 | 31.1 | 17.2 | 29.3 | 8.2 | 1.7 | 1.7 |
| Chloroform (CHCl$_3$) | 0.5 | 5.0 | 14.0 | 34.2 | 19.2 | 19.5 | 9.4 | 2.8 | 0.9 |
| Methylene chloride (CH$_2$Cl$_2$) | 0.5 | 5.0 | At least 80% branched chain isomers | | | | | | |
| Trichloroacetyl chloride (CCl$_3$COCl) | 0.5 | 8.4 | 14.0 | 34.5 | 18.6 | 20.6 | 8.9 | 2.7 | 0.8 |
| Methyl chloride (CH$_3$Cl) | 0.5 | 2.7 | 97.1 | 0.3 | 0.4 | 0.1 | | 1.8 | 0.2 |
| Ethylene chloride (C$_2$H$_4$Cl$_2$) | 0.5 | 5.8 | 97.3 | | 0.4 | | | 2.1 | 0.2 |
| Nitrosyl chloride (NOCl) | 0.5 | 2.1 | 97.5 | | 0.3 | | | 1.9 | 0.1 |
| Phosphoryl chloride (POCl$_3$) | 0.5 | | 94.0 | 0.9 | 1.3 | 0.5 | 0.2 | 3.0 | |
| Silicon tetrachloride (SiCl$_4$) | 0.5 | | 97.4 | | 0.3 | | | | 0.3 |
| Monochloroacetyl chloride (CH$_2$ClCOCl) | 0.5 | 13.0 | 95.1 | 0.5 | 1.1 | 0.2 | 0.1 | 2.9 | 0.1 |
| Equilibrium distribution at 300° F | | | 9.2 | 30.1 | 14.7 | 36.5 | 9.5 | | |
| Hexane feed stock | | | 96.7 | | 1.1 | | | 2.2 | |

It will be noted that contact of a platinized eta alumina with an organic chloride activating agent having an atomic ratio of chlorine to carbon of at least two (as exemplified by carbon tetrachloride, chloroform, methylene chloride, phosgene and trichloroacetyl chloride) produces a highly active isomerization catalyst. The tests with organic chlorides containing less than this ratio of chlorine (as exemplified by methyl chloride, ethylene chloride and monochloroacetyl chloride) show that little or no isomerization activity is imparted by treatment even though they may introduce an even greater amount of chlorine into the catalyst. The tests with nitrosyl chloride, phosphoryl chloride and silicon tetrachloride show that treatment with a chlorinated compound even containing as much chlorine as silicon tetrachloride may not achieve introduction of chlorine or activation of the catalyst.

EXAMPLE III

The carbon tetrachloride activated eta alumina catalyst prepared in accordance with Examples II is contacted with normal butane at 370° F., 500 p.s.i.g. pressure, a liquid hourly space velocity of 1.50, and with a hydrogen to hydrocarbon mole ratio of 0.3:1. An isomerization product is withdrawn containing 61.4% isobutane. Normal butane is separated from the isomerized product and recycled with the normal butane feed to effect conversion of substantially all of the normal butane to isobutane on an ultimate yield basis.

EXAMPLE IV

The phosgene activated eta alumina catalyst prepared in accordance with Example II is contacted with normal butane at 370° F., 500 p.s.i.g. pressure, a liquid hourly space velocity of 2.0, and with a hydrogen to hydrocarbon mole ratio of 0.3:1. An isomerization product is withdrawn containing 65% isobutane. Normal butane is separated from the isomerized product and recycled with the normal butane feed to effect conversion of substantially all of the normal butane to isobutane on an ultimate yield basis.

EXAMPLE V

A platinized alumina composite containing combined halogen is prepared employing gamma alumina. Combined halogen is introduced into the gamma alumina by treating the alumina sol with hydrofluoric and hydrochloric acid prior to impregnation with platinum. The platinized gamma alumina has the following composition: 0.4 weight percent platinum, 0.3 weight percent chlorine, and 0.4 weight percent fluorine. The foregoing platinized alumina is contacted with n-hexane at 300° F., 1 liquid hourly spaced velocity, and with a hydrogen to hydrocarbon ratio of 2:1 and no conversion to branched chain isomers is obtained. This example, by comparison with Example III, shows that combined halogen added by treatment of the alumina base with a mineral acid is ineffective to impart high isomerization activity at low temperatures whereas substantial activity is imparted by activation with an acid chloride.

EXAMPLE VI

Examination by infra-red absorption of a catalyst prepared in accordance with the method of this invention, a platinized alumina containing combined halogen added by treating alumina with an inorganic acid, and a platinized alumina upon which aluminum chloride has been sublimed shows in each case that the chlorine is associated with the platinum and alumina in distinctly different ways. A catalyst, designated Catalyst "A," is prepared by calcing beta alumina trihydrate at 1,000° F. for two hours, cooling, impregnating with an aqueous solution of chloroplatinic acid, drying and calcining at 1,050° F. for two hours. Catalyst "A" comprises eta alumina, 0.60 weight percent platinum and 0.6 weight percent chlorine said chlorine having been introduced as a component of an inorganic acid, the chloroplatinic acid. Catalyst "A" is an active hydroisomerization catalyst at about 750° F. but is inactive for the isomerization of normal hexane at the hydroisomerization conditions of Example II.

A portion of Catalyst "A" is treated by subliming aluminum chloride thereon to form a composite designated Catalyst "B" comprising eta alumina, .57 weight percent platinum and 4.7 weight percent chlorine. Another portion of Catalyst "A" is treated with carbon tetrachloride vapor at 500° F. forming a composite designated Catalyst "C" comprising eta alumina, 0.57 weight percent platinum and 6.1 percent chlorine. Catalysts "B" and "C" are active for the isomerization of normal hexane at the hydroisomerization conditions of Example II. Catalysts "A," "B" and "C" are examined by reducing in hydrogen at 350° C. for 16 hours, chemisorbing carbon monoxide thereon, and observing the resulting infra-red spectra of the chemisorbed carbon monoxide, plots of which are shown in the accompanying figure. The spectra obtained with Catalysts "A" and "C" show peaks which evidence carbon monoxide adsorbed on metallic platinum at 4.85 microns wave length. The reduced absorbance of "C" as compared with "A" is evidence that chlorine added by contact of Catalyst "A" with carbon tetrachloride to form Catalyst "C" changes a portion of the platinum to a form which does not chemisorb carbon monoxide. The spectrum obtained with Catalyst "B" shows a peak at 4.65 microns. The shift in wave length of "B" as compared with "A" is evidence that chlorine added by contacting Catalyst "A" with aluminum chloride to form Catalyst "B" changes the chemical form of the platinum which is present. A comparison of spectrum B and spectrum C shows that the change in chemical nature of the platinum resulting from the aluminum chloride treatment is different from the effect of carbon tetrachloride treatment in that alumina chloride treatment changes the wave length at which carbon monoxide is adsorbed whereas the treatment with carbon tetrachloride reduces the amount of platinum which chemisorbs carbon monoxide.

EXAMPLE VII

Another series of catalysts is prepared to show that chlorine present in prior art catalysts fails to impart high activity for isomerization at low temperatures. A composite of platinum and alumina identified as Catalyst "D" is prepared by pilling beta-alumina trihydrate, calcining at 930° F. for two hours, cooling to room temperature, impregnating with an aqueous solution of chloroplatinic acid and ethylene diamine, drying, and calcining at 1,050° F. for two hours. Catalyst "D" is found by X-ray diffraction to comprise predominantly eta alumina, by chemical analysis to contain 0.6 weight percent platinum, and 0.6 weight percent chlorine, and by nitrogen adsorption to have a surface area of 335 square meters per gram. Catalyst "D" is inactive as a hydroisomerization catalyst for the isomerization of hexane at 300° F., 300 pounds per square inch gauge, a 1 liquid hourly space velocity and with a hydrogen to hydro carbon mole ratio of 2 to 1.

A portion of Catalyst "D" is contacted with n-hexane at 800° F., a pressure of 300 pounds per square inch gauge, a liquid hourly space velocity of 1, and a hydrogen to hydrocarbon mole ratio of 2 to 1 for 24 hours during which period carbon tetrachloride was added at a rate of 200 parts per million dissolved in the hexane feed and the following hydrocarbon product is obtained evidencing substantial isomerization and hydrocracking:

| Product | Weight Percent Feed |
|---|---|
| Gases | 51.7 |
| Liquid Product: | |
|     Butanes and lighter | 6.7 |
|     Pentanes | 10.5 |
|     Normal hexane | 6.6 |
|     3-methyl pentane | 8.2 |
|     2-methyl pentane and 2,3-dimethyl butane | 13.6 |
|     2,2-dimethyl butane | 2.7 |
|     Total liquid product | 48.3 |

The catalyst at the end of the aforesaid 24-hour run is designated Catalyst "E."

Catalyst "E" is contacted with n-hexane at 300° F., a pressure of 300 pounds per square inch gauge, a liquid hourly space velocity of 1, and at a hydrogen to hydrocarbon mole ratio of 2 to 1 for 24 hours during which period carbon tetrachloride is added at a rate of 200 parts per million dissolved in the hexane feed. A liquid product yield of 100 percent is obtained and the hexane feed is unchanged evidencing a complete lack of isomerization activity at the conditions employed. The catalyst at the end of the aforesaid 24-hour run is designated Catalyst "F" and is found to contain 3.1 weight percent chlorine.

A 423 gram portion of Catalyst "D" is admixed with 48 grams of liquid carbon tetrachloride and the admixture heated in the presence of a gaseous atmosphere comprising 70 percent oxygen and 30 percent nitrogen. The resulting catalyst is designated Catalyst "G" and contains 7.4 weight percent chlorine. Catalyst "G" is contacted with n-hexane at 300° F., 300 pounds per square inch gauge, a 1 liquid hourly space velocity and with a hydrogen to hydrocarbon mole ratio of 2 to 1. No halogen was added to the feed stock during the run. The following hydrocarbon products are obtained evidencing high isomerization activity at the conditions employed:

| Product | Weight Percent Feed |
|---|---|
| Gases | 4.0 |
| Liquid Product: | |
| Butanes and pentanes | Trace |
| Normal hexane | 8.1 |
| 3-methyl pentane | 16.3 |
| 2-methyl petane and 2,3-dimethyl butane | 41.6 |
| 2,2-dimethyl butane | 30.0 |
| Total liquid product | 96.0 |

We claim:

1. The method of preparing a catalyst adapted to the isomerization of an isomerizable hydrocarbon which comprises compositing platinum with alumina forming a composite comprising a major portion of alumina and about 0.01 to about 1.0 percent by weight platinum, contacting said composite with an activating agent consisting essentially of an organic chloride selected from the group consisting of carbon tetrachloride, chloroform, methylene chloride, phosgene and trichloracetyl chloride, and heating said composite in contact with said activating agent containing chlorine in an amount within the range of about 5.0 to 40.0 percent by weight of the platinum alumina composite to a temperature within the range of about 300° to 650° F.

2. The process of claim 1 wherein said activating agent is phosgene.

3. The process of claim 1 wherein said activating agent is carbon tetrachloride.

4. The process of claim 1 wherein said alumina comprises eta alumina.

5. The process of claim 1 wherein said alumina comprises gamma alumina.

6. The method of claim 1 wherein the chlorine content of said catalyst is in the range of about 5.0 to 8.4 percent by weight.

7. The catalyst prepared by the method of claim 1.

8. A method of preparing a catalyst suitable for the isomerization of paraffin hydrocarbons at temperatures below 400° F. which comprises heating active alumina containing a minor but effective amount of platinum metal in contact with an activating agent selected from the group consisting of trichloroacetyl chloride and a compound of the general formula:

wherein X, when a monovalent radical, is selected from the group consisting of H, and Cl, where Y when a monovalent radical is selected from the group consisting of H, and Cl, and where X and Y when they together form a divalent radical are O, under non-reducing conditions, at at temperature in the range 300 to 650° F. and continuing the activating treatment until the chlorine content of the catalyst is in the range of about 5 to 8.4% by weight.

9. The method of isomerizing a hydrocarbon selected from the group consisting of butanes, pentanes and hexanes, which comprises contacting said hydrocarbon at isomerization conditions including a reaction temperature within the range of about 250 to 400° F., a liquid hourly space velocity within the range of about 0.5 to 2.0, and a hydrogen to hydrocarbon mole ratio within the range of about 0.20:1 to 5:1, with a catalyst consisting essentially of alumina, platinum and chlorine, said chlorine being introduced into said catalyst by contacting a composite of platinum and alumina with an activating agent consisting essentially of an organic chloride selected from the group consisting of carbon tetrachloride, chloroform, methylene chloride, phosgene and trichloracetylchloride, and heating said composite in contact with said activating agent containing chlorine in an amount within the range of about 5.0 to 40.0 percent by weight of the platinum alumina to a temperature within the range of about 300 to 650° F.

10. The method of claim 9 wherein said catalyst comprises 0.01 to 1.0 percent platinum.

11. The method of claim 9 wherein said activating agent is phosgene.

12. The method of claim 9 wherein said activating agent is carbon tetrachloride.

13. The method of claim 9 wherein the chlorine content of said catalyst is in the range of about 5.0 to 8.4 percent by weight.

References Cited

UNITED STATES PATENTS

| | | | |
|---|---|---|---|
| 2,642,384 | 6/1953 | Cox | 260—683.65UX |
| 2,798,105 | 7/1957 | Heinemann et al. | 260—683.65 |
| 2,880,168 | 3/1959 | Feller | 208—140 |
| 2,939,897 | 6/1960 | Beber et al. | 260—683.68 |
| 2,944,097 | 7/1960 | Starnes et al. | 260—683.68 |

CURTIS R. DAVIS, Primary Examiner

U.S. Cl. X.R.

252—441, 442